United States Patent
Mutschler

(10) Patent No.: US 8,797,521 B2
(45) Date of Patent: Aug. 5, 2014

(54) PROCESS AND DEVICE FOR MEASURING THE ROTATION ANGLE OF TWO OBJECTS ROTATING IN RELATION TO EACH OTHER

(71) Applicant: Sick Stegmann GmbH, Donaueschingen (DE)

(72) Inventor: Reinhold Mutschler, Villingen-Schwenningen (DE)

(73) Assignee: Sick Stegmann GmbH, Donaueschingen (DE)

( * ) Notice: Subject to any disclaimer, the term of this patent is extended or adjusted under 35 U.S.C. 154(b) by 0 days.

(21) Appl. No.: 13/684,306

(22) Filed: Nov. 23, 2012

(65) Prior Publication Data

US 2013/0135612 A1 May 30, 2013

(30) Foreign Application Priority Data

Nov. 29, 2011 (EP) .................................... 11191203

(51) Int. Cl.
  *G01B 11/26* (2006.01)
  *G01B 11/27* (2006.01)
  *G01C 15/00* (2006.01)

(52) U.S. Cl.
  CPC ............... *G01B 11/26* (2013.01); *G01B 11/27* (2013.01); *G01C 15/004* (2013.01)
  USPC ....................................... 356/138; 356/152.1

(58) Field of Classification Search
  CPC ....... G01B 11/26; G01B 11/27; G01C 15/004
  USPC ................................ 356/138–152.2, 364–370
  See application file for complete search history.

(56) References Cited

U.S. PATENT DOCUMENTS

| | | | | |
|---|---|---|---|---|
| 3,877,816 | A * | 4/1975 | Weiss et al. | 356/138 |
| 3,932,039 | A * | 1/1976 | Frey | 356/138 |
| 5,815,269 | A * | 9/1998 | Crabb et al. | 356/364 |
| 2003/0095257 | A1 * | 5/2003 | Wijntjes et al. | 356/364 |
| 2005/0002032 | A1 * | 1/2005 | Wijntjes et al. | 356/364 |
| 2012/0287436 | A1 * | 11/2012 | Speidel et al. | 356/364 |
| 2013/0128269 | A1 * | 5/2013 | Hopp et al. | 356/364 |

FOREIGN PATENT DOCUMENTS

| | | |
|---|---|---|
| DE | 102005031966 A1 | 1/2007 |
| GB | 1498409 A | 1/1978 |

* cited by examiner

*Primary Examiner* — Michael P Stafira
(74) *Attorney, Agent, or Firm* — Nath, Goldberg & Meyer; Jerald L. Meyer

(57) ABSTRACT

The disclosure relates to a process for measuring the rotation angle of two objects rotating in relation to each other, with a transmitter assigned to one of the objects, and with an element which influences the direction of polarization, where the transmitter and the element rotate relative to each other, and where the luminous intensity passing through, or reflected by, the element is measured by a receiver and then evaluated as a signal dependent on the rotation angle, and where the receiver groups of receiver elements sensitive to polarization, and where the polarization planes of the receiver elements in each group are rotated in relation to each other, and where the reception signals of at least two of the receiver elements are evaluated independent of each other in a monitoring mode. The disclosure also relates to an apparatus for implementing the process.

14 Claims, 4 Drawing Sheets

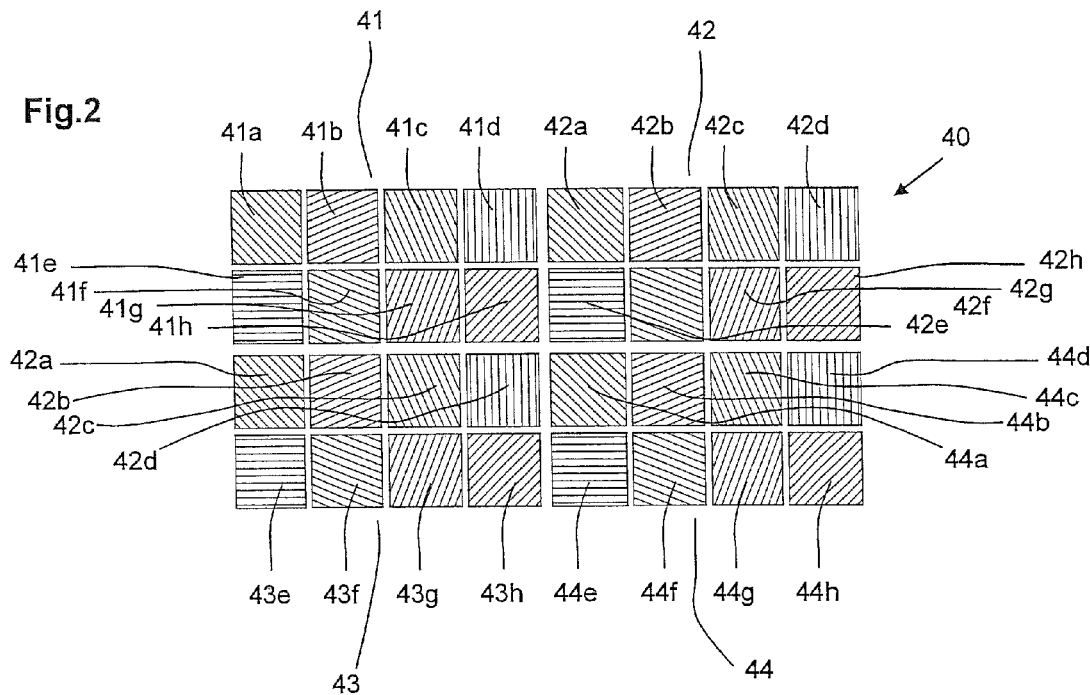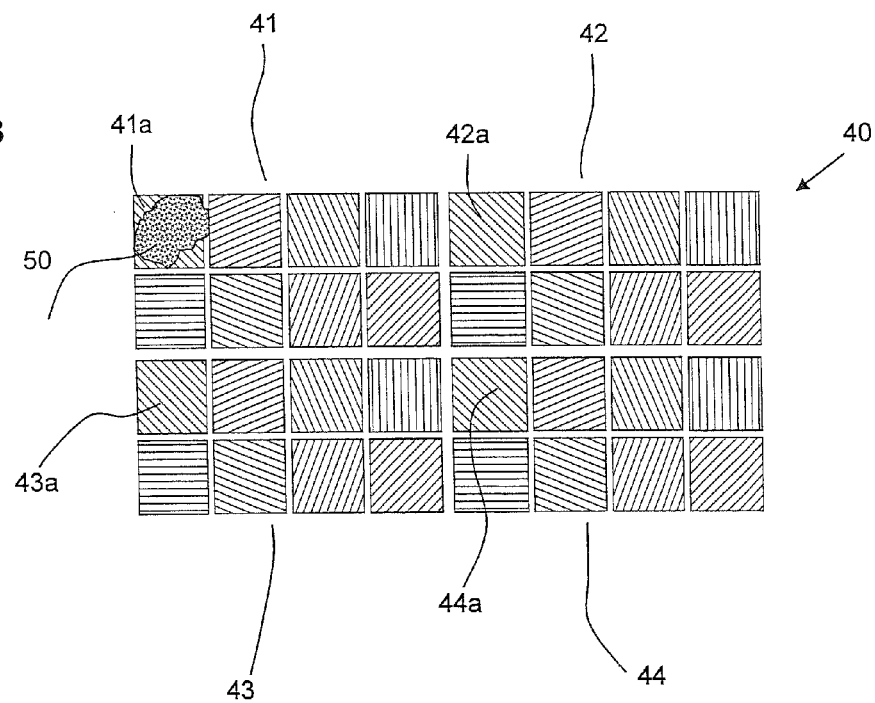

Figure 1:
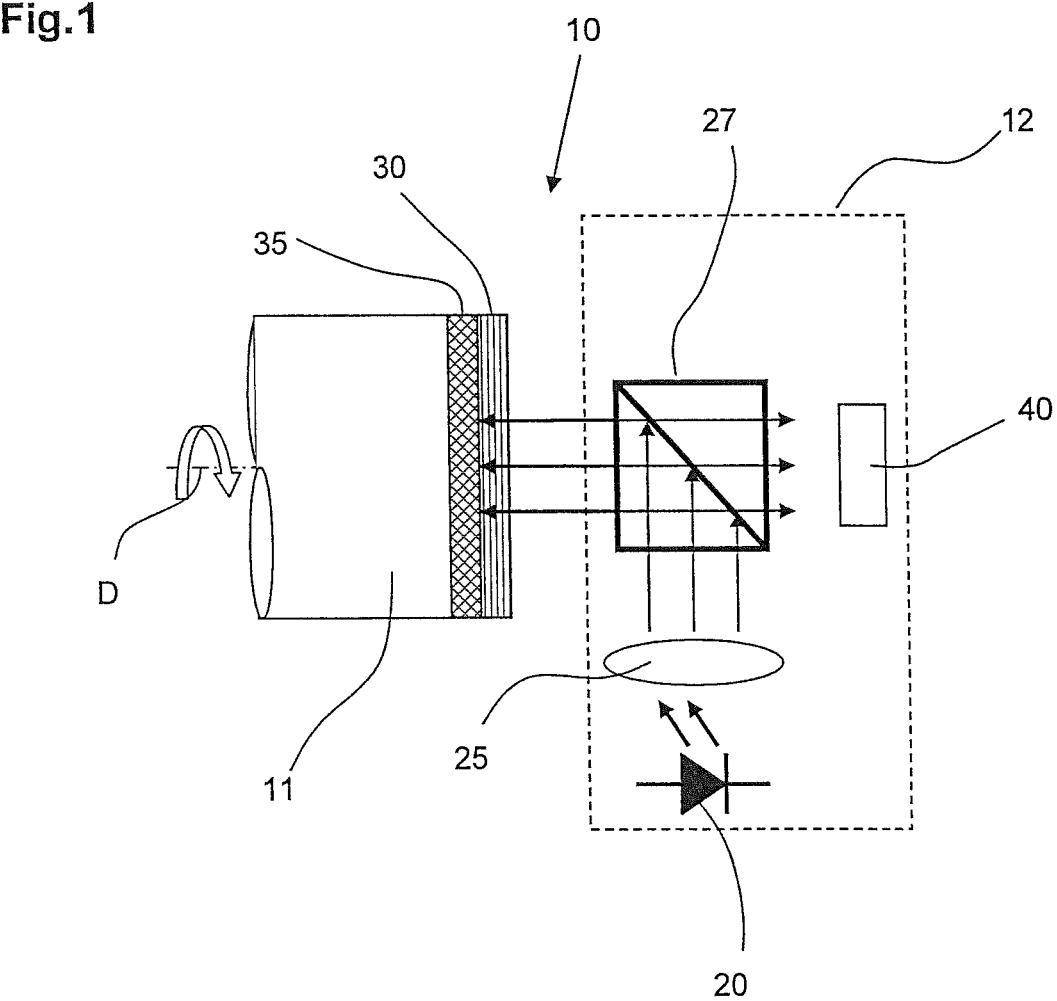

PROCESS AND DEVICE FOR MEASURING THE ROTATION ANGLE OF TWO OBJECTS ROTATING IN RELATION TO EACH OTHER

The invention relates to a process for measuring the rotation angle of two objects rotating in relation to each other, in accordance with the preamble of claim 1, and to a device for measuring the rotation angle of two objects rotating in relation to each other, in accordance with the preamble of claim 13.

For many applications, it is of basic importance to measure the rotation angle of a rotating object. In general, the rotation angle of the rotating object is measured in relation to a stationary object, to which a measuring gauge is attached. For example, the rotating object may be the rotating shaft of a motor, which revolves in relation to a stationary machine part. The measuring gauge may be both incremental and absolute. Here it is desirable for the measurement of the relative rotational movement to be as insensitive to tolerance as possible, but also to afford a high degree of accuracy. In the ideal case, the measurement will be performed without contact, to thereby avoid mechanical wear.

EP 2 187 178 A1 discloses a principle of measurement that uses the optical polarization of light. To measure the rotation angle of two objects rotating opposite each other, a transmitter emits light that is polarized in linear fashion. The light passes through a polarization filter which rotates opposite the transmitter as a function of the rotation angle. The intensity of the light passing through the polarizing filter is measured by a receiver and is evaluated or plotted as a signal that is dependent on the rotation angle.

European patent application 11 003 980.7 discloses a device for measuring the rotation angle of two objects rotating in relation to each other, with a transmitter assigned to the object, and with an element which influences the direction of polarization, such that the transmitter and the element influencing the direction of polarization rotate in relation to each other as a function of the rotation angle, and with a receiver which measures the luminous intensity passing through the element influencing the direction of polarization in order to produce a signal dependent on the rotation angle, such that the receiver has at least two groups, each with at least two receiver elements, where each receiver element is designed as a detector sensitive to polarization, and where the planes of polarization of the receiver elements in each group are rotated in relation to each other. The use of two or more receiver elements in a single group improves the accuracy in measuring the rotation angle, since the different optical channels can be averaged. The use of at least two groups of receiver elements, which, in particular, have identical designs, results in a plurality of channels, and this allows the resolution to be additionally improved through statistical averaging.

The known devices for measuring the rotation angle of two objects rotating in relation to each other are so designed that the transmitter, the element influencing the direction of polarization, and the receiver are not, as a rule, enclosed in a single housing that protects against contamination or damage. As a result the optical path is at least partially exposed.

In fulfilling the safety standards for a secure determination of position, special precautions are necessary in order to identify contamination or damage to the device, particularly to the element influencing the direction of polarization and/or the receiver elements.

The goal of the invention, therefore, is to specify an improved device for measuring the rotation angle of two objects rotating relative to each other, as well as to specify an improved process for measuring the rotation angle of two objects rotating relative to each other—which, in particular, are able to fulfill the requirements of the safety standards for a secure determination of position and to identify contamination or damage to the device, particularly the receiver and/or the element influencing the direction of polarization.

The goal of the invention is achieved by a process with the features of patent claim 1 and by a device with the features of patent claim 13.

Advantageous embodiments and elaborations of the invention are indicated in the dependent claims.

The process according to the invention for measuring the angle of rotation of two objects rotating in relation to each other—with a transmitter which is assigned to one of the objects, and with an element which influences the direction of polarization, where the transmitter and the element which influences the direction of polarization rotate relative to each other as a function of the rotation angle, and where the luminous intensity passing through, or reflected by, the element influencing the direction of polarization and measured by a receiver is evaluated as a signal dependent on the rotation angle, and where the receiver has at least two groups, each with at least two receiver elements, such that each receiver element is designed as a detector sensitive to polarization, and where the polarization planes of the receiver elements in each group are rotated in relation to each other—is distinguished by the fact that the reception signals of at least two of the receiver elements can be evaluated independent of each other in a monitoring mode.

Because of the independent evaluation or plotting of the reception signals of the receiver elements, particularly those receiver elements having the same direction of polarization, redundant paths are provided which permit the device to be used in security applications. Furthermore, the independent evaluation of the reception signals makes it possible to monitor for cases of contamination or damage, inasmuch as a comparison of the given reception signals in such cases of contamination or damage result in a discrepancy among the signals, while the receptions signals of the receiver elements showing no contamination or damage, and having the same polarization planes, must be identical. In a simple manner and without additional components, it is thus possible to monitor for contamination or damage, and the use of the device, improved in this way, is possible in safety applications.

According to a preferred embodiment of the invention, the reception signals of at least two of the receiver elements having the same polarization planes are compared in a monitoring mode, to thereby make possible the monitoring for cases of contamination or damage.

According to a preferred embodiment of the invention, the reception signals of at least two receiver elements are converted in the monitoring mode into an angle, and the computed angle is compared with the angle computed from the reception signals of at least two other receiver elements having the same relative angular offset of polarization planes, each relative to each other.

According to a preferred embodiment of the invention, the reception signals of at least two of the receiver elements which are both positioned in one of the groups are converted in the monitoring mode into an angle, and the computed angle is compared to the angle which was computed from the reception signals of at least two other receiver elements that both belong to one of the other groups and that have the same relative angular offset of polarization planes, each relative to each other.

It is advantageously specified that when the comparison yields a discrepancy, the discrepancy is compared with a stored tolerance value. The tolerance value describes the admissible degree of contamination and its effect on accuracy.

According to a preferred embodiment, a warning is issued when the tolerance value is exceeded, for example, in the form of an optical, acoustical, or electrical signal. This signal can be evaluated by a superordinate control system, in order to advise of the possibility of contamination or damage and to allow the device to be monitored.

According to a preferred embodiment of the invention, the contrast of a single receiver element is determined in the monitoring mode, or the contrast of one or a plurality of groups of receiver elements is determined, and this contrast is compared to a desired contrast value which has been stored for either a single receiver element or a one or a plurality of groups of receiver elements. Here the term "contrast" is defined as the ratio of the maximum amplitudes of s-polarized light and p-polarized light. Each individual receiver element has a desired contrast, which can be stored. For discrepancies in the contrast from a stored contrast of desired value, it can be concluded that there is an instance of contamination or damage.

It is also advantageously specified that the contrasts established in the monitoring mode are stored in a storage unit, in order to provide the capability of tracking the development of the given contrast in the device over the latter's period of use.

The monitoring mode is advantageously activated when the device is turned on, or at regular intervals of time, in order to monitor the device regularly for cases of contamination or damage. According to a particularly preferred embodiment of the invention, the monitoring mode is kept active continuously, in parallel with the regular measuring mode, in order to make redundant signals paths available in the case of safety applications.

The reception signals of at least two of the receiver elements are evaluated, each independent of the other, for two or more different relative positions that are occupied by the two objects. This is done in order to distinguish a change that is dependent on angle or motion from a static change in the signals of individual receiver elements. It is thereby possible to distinguish a local contamination of the receiver elements from a local contamination of the element influencing the direction of polarization.

According to a preferred embodiment of the invention, the reception signals of the receiver elements are collectively amplified in a measuring mode and are evaluated and, in particular, are averaged, in order to thereby improve the accuracy in measuring the rotation angle. This evaluation must particularly take into account the angular offset of the polarization planes when the receiver elements have different polarization planes.

Individual receiver elements, or groups of receiver elements, can be advantageously switched off, and this is particularly useful when contamination or damage to an individual receiver element, or group of receiver elements, has been identified. By switching off the given receiver elements, the tolerance for contamination or damage can be increased.

A preferred further elaboration of the invention specifies that the monitoring mode can be activated by a superordinate control system acting over an interface, or by a control system integrated into the receiver, particularly a sequence control system.

The device according to the invention for measuring the angle of rotation of two objects rotating in relation to each other—with a transmitter which is assigned to one of the objects; with an element which influences the direction of polarization, such that the transmitter and the element which influences the direction of polarization rotate relative to each other as a function of the rotation angle; and with a receiver which measures the luminous intensity passing through, or reflected by, the element influencing the direction of polarization, in order to produce a signal dependent on the rotation angle, where the receiver has at least two groups, each with at least two receiver elements, and where each receiver element is designed as a detector sensitive to polarization, and where the polarization planes of the receiver elements in each group are rotated in relation to each other—is distinguished by the fact that the reception signals of at least two of the receiver elements can be evaluated independent of each other in at least one monitoring mode. This allows redundant signal paths to be provided in the case of safety applications. It also permits the device to be monitored for cases of contamination and damage.

The different groups of receiver elements are advantageously positioned so as to be spatially separate from each other, with the result that their reciprocal influence is minimized and the given security requirements are fulfilled in making a certain determination of position.

According to one advantageous embodiment of the invention, the polarization planes of the receiver elements in each group are rotated $180°/n$ in relation to each other, where n is the number of receiver elements in the given group. This permits the device to have a particularly simple design.

According to an advantageous embodiment of the invention, the transmitter emits pulsed light or is supplied with a modulation frequency, in order to allow background light to be suppressed and simultaneously to permit a functional monitoring of the signal paths in the case of safety applications.

The device is advantageously provided with an output unit which emits an optical, acoustical, or other warning signal, in order to thereby indicate the possibility of contamination, damage, or other malfunction and to permit the device to the monitored.

One exemplary embodiment of the invention will next be described on the basis of the following figures. Shown are:

FIG. 1 a schematic depiction of the light path in a device for measuring the angle of rotation of two objects rotating in relation to each other FIG. 2 a schematic depiction of the receiver of the device of FIG. 1

FIG. 3 the receiver of FIG. 2, with a contaminated receiver element

Figure 4A:
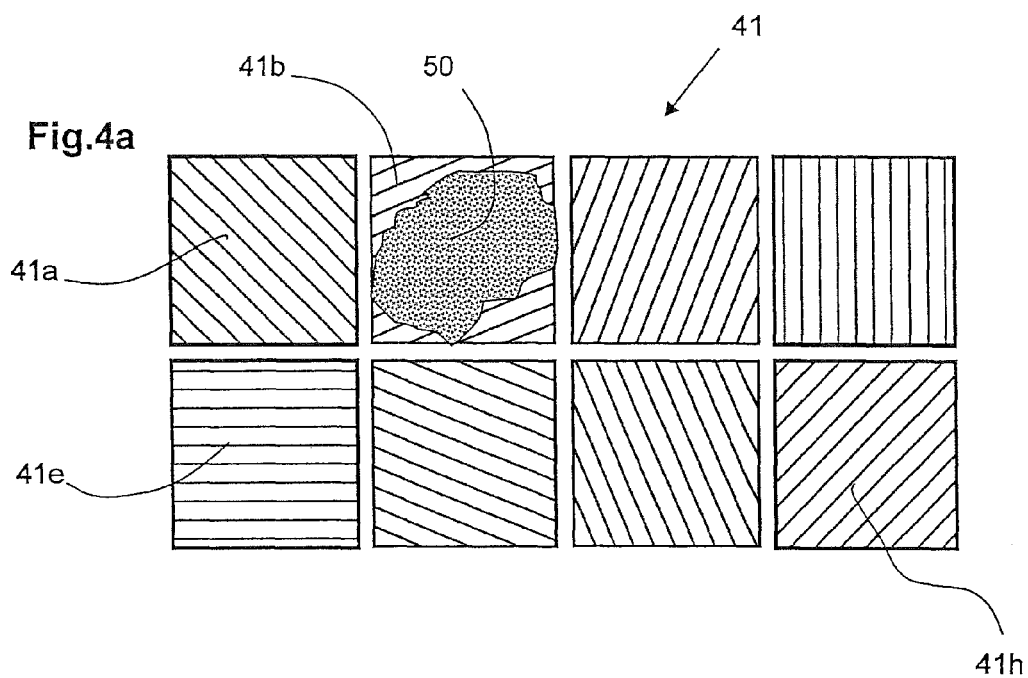
Figure 4B:
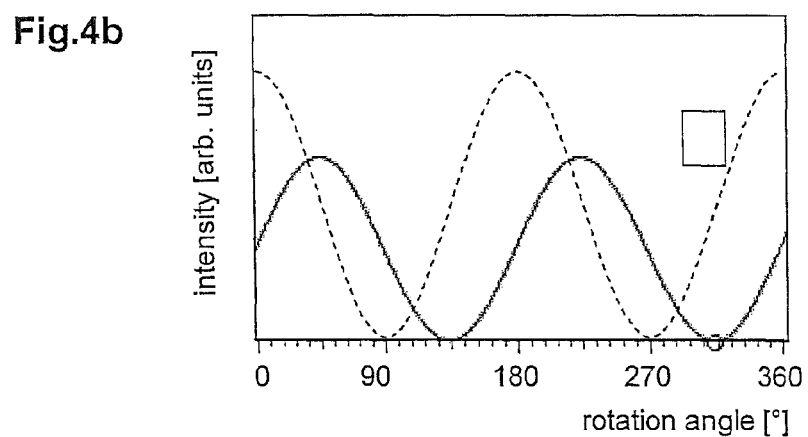

FIG. 4*a* a group of receiver elements belonging to the receiver of FIG. 2, with a contaminated receiver element FIG. 4*b* the luminous intensities which are detected with a contaminated and an uncontaminated receiver element belonging to the group of receiver elements of FIG. 4*a*

Figure 4C:
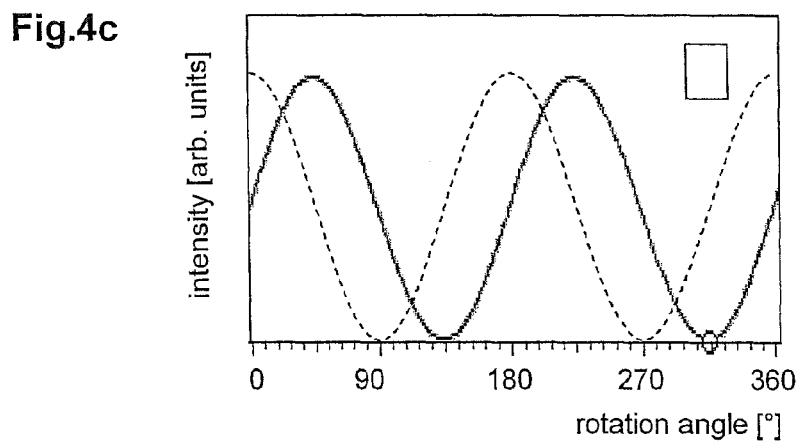
Figure 5:
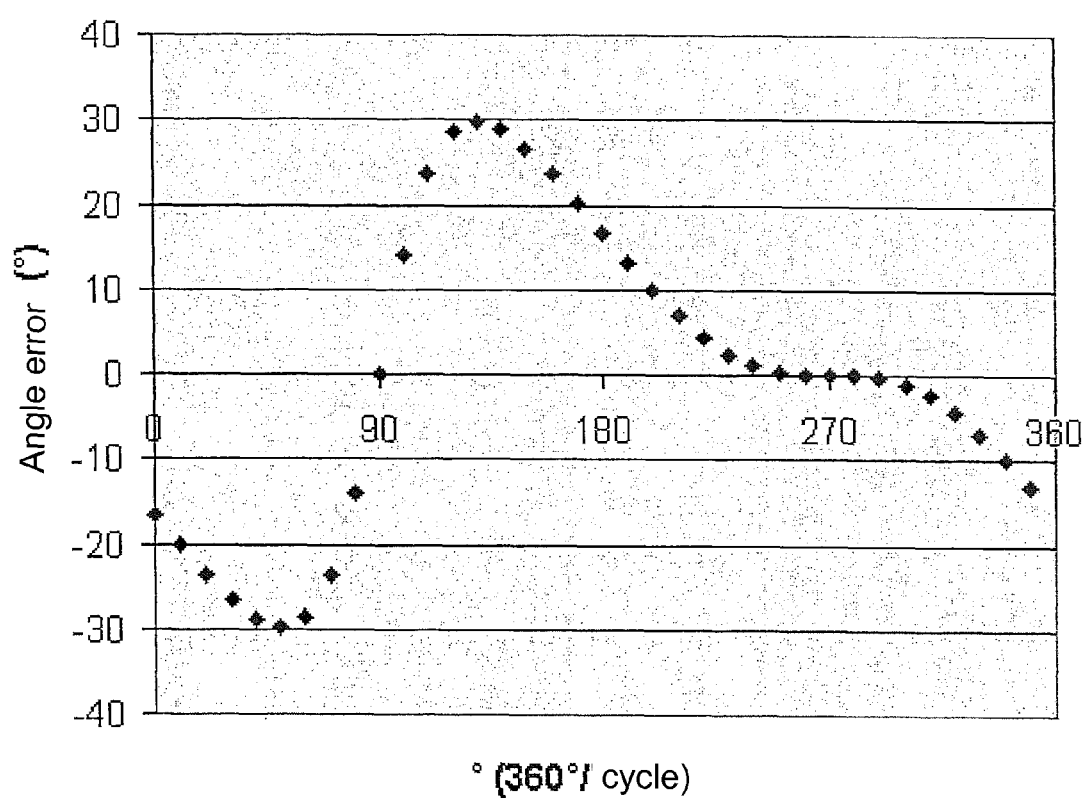

FIG. 4*c* the luminous intensities which are detected with two uncontaminated receiver elements belonging to the group of receiver elements of FIG. 4*a*, and FIG. 5 the angular difference from the desired angle in an evaluation of the luminous intensities of a contaminated receiver element and an uncontaminated receiver element from the group of receiver elements of FIG. 4*a*.

FIG. 1 provides a schematic depiction of a device 10 for measuring the rotation angle of two objects 11, 12 rotating in relation to each other. Here there is only one object 11 that rotates around an axis D, e.g., the shaft of a motor, and it is the rotation angle of the shaft relative to a fixed object, e.g., the motor housing or a stationary machine part, that must be determined. The device 10 has a transmitter 20, which is designed, e.g., as an unpolarized light source, e.g., an LED. The light radiated by the transmitter 20 is collimated by means of a lens 25. Since in the depicted embodiment the transmitter 20 radiates at an angle perpendicular to the rotating axis of the object 11, the light released by the transmitter 20 is coupled into the light path by a beam splitter 27 and falls on the front face of the rotating shaft 11. Positioned on the front face of the rotating object 11 is an element 30 that influences the direction of polarization, and this element 30 takes the form of, e.g., a waveplate or of a polarizer which is specifically designed as a reflective polarizer. This can be realized by, e.g., a reflector 35 positioned behind the polarizer, e.g., a mirror. When a waveplate is employed as the element 30 influencing the direction of polarization, the light of the transmitter 20 is polarized by another polarizer, or a transmitter 20 is used which itself emits polarized light.

The reflected light passes through the beam splitter 27 and onto a receiver 40. Both the transmitter 20 and the receiver 40 are firmly fixed to the object 12. The position of the transmitter 20 and the receiver 40 can naturally be reversed.

FIG. 2 schematically depicts the design of the receiver 40, which consists of four groups 41, 42, 43, 44, each with eight receiver elements 41a, 41b, 41c, 41d, 41e, 41f, 41g, 41h, 42a, 42b, 42c, 42d, 42e, 42f, 42g, 42h, 43a, 43b, 43c, 43d, 43e, 43f, 43g, 43h, 44a, 44b, 44c, 44d, 44e, 44f, 44g, 44h. The eight receiver elements 41a-h, 42a-h, 43 a-h, 44 a-h belonging to a group 41, 42, 43, 44 are designed as detectors sensitive to polarization, to which end, e.g., a polarization filter is positioned in front of each receiver element 41a-44h. The polarization planes of the receiver elements 41a-44h of each group 41, 42, 43, 44 are each rotated 180°/n in relation to each other, where n is the number of receiver elements in the given group. In the present case of eight receiver elements, which is given by way of example, the polarization planes of the receiver elements are thus rotated by 22.5° in relation to each other. It is understood that two, four, or more receiver elements per group are possible.

The groups 41, 42, 43, 44 are identically designed, so that in each of the groups there is positioned a receiver element, e.g., 41a, that has the same polarization plane as a receiver element, e.g., 42a, 43a, 44a, belonging to the other groups 42, 43, 44. With the use of eight receiver elements 41a-h, 42a-h, 43a-h, 44a-h per group (as in the present example), a total of eight different optical channels are formed, and these are multiplied by four when four identical groups 41, 42, 43, 44 are employed.

In evaluating the signals of the individual receiver elements 41a-h, 42a-h, 43a-h, 44a-h, the angle is preferably calculated using the eight different optical channels. For n=8, the division into n polarization planes yields signals that are each phase-shifted by 22.5°, and this increases the accuracy of the angular measurement, given an appropriate evaluation. Averaging the signals of receiver elements with identical polarization planes, e.g., 41a, 42a, 43a, 44a, or the angles calculated from these signals, is also possible as a means of improving the resolution.

However, the invention specifies an independent evaluation of at least two of the receiver elements 41a, 41b, 41c, 41d, 41e, 41f, 41g, 41h; 42a, 42b, 42c, 42d, 42e, 42f, 42g, 42h; 43a, 43b, 43c, 43d, 43e, 43f, 43g, 43h; 44a, 44b, 44c, 44d, 44e, 44f, 44g, 44h, e.g., two receiver elements having identical polarization planes or two receiver elements whose polarization planes have a defined angular offset—and preferably specifies an independent evaluation of all the receiver elements 41a, 41b, 41c, 41d, 41e, 41f, 41g, 41h; 42a, 42b, 42c, 42d, 42e, 42f, 42g, 42h; 43a, 43b, 43c, 43d, 43e, 43f, 43g, 43h; 44a, 44b, 44c, 44d, 44e, 44f, 44g, 44h, so as to provide four mutually independent signal paths for each of the eight optical channels. This permits the device 10 to be used in safety applications demanding redundant signal evaluations.

The independent evaluation of the reception signals of receiver elements 41a-44h also makes possible the identification of contamination or damage.

As shown in FIG. 3, the receiver element 41a of group 41 among the receiver elements belonging to the receiver 40 is contaminated with a particle of dirt 50. In an independent evaluation of the signals of receiver elements 41a, 42a, 43a, 44a, which each have the same polarization plane, and in a comparison of these signals, it can be determined that the signal intensity of the receiver element 41a is smaller than the signal intensities of the receiver elements 42a, 43a, 44a, which are basically identical—so that contamination of, or damage to, the receiver element 41a can be inferred. When this kind of contamination or damage is identified, a corresponding error message is preferably issued by an output unit. According to one embodiment of the invention, it is possible to completely switch off the receiver element 41a until the contamination or damage is removed. In an alternative embodiment, the entire group 41 of receiver elements can be completely shut off.

Since slight fluctuations among signal intensities are fundamentally possible and since a slight degree of contamination may not impede the angular measurement, a tolerance value is preferably stored, and the discrepancy between the signal intensity of receiver element 41a and the signal intensities of receivers 42a, 43a, 44a will be compared with this tolerance value. A warning message is only issued when the stored tolerance value is exceeded.

As shown in FIG. 4, the presence of a particle of dirt 50 can be identified not only by comparing the receiver elements having identical polarization planes, but also by comparing the signals of receiver elements having different polarization planes. FIG. 4a depicts the group 41 of eight receiver elements 41a-h when the receiver element 41b is dirty. FIG. 4b shows the luminous intensities of two receiver elements 41a, 41b, where both an amplitude error and an offset error have been caused by the dirt particle 50. For the sake of comparison, FIG. 4c shows the expected signal amplitudes of receiver elements 41a, 41b when the dirt particle 50 is not present. The polarization planes of the two receiver elements 41a, 41b differ here by 22.5°, which results in a defined angular offset between the two signal amplitude curves. If the receiver elements 41a-41h within group 41 are also evaluated independent of each other, the number of groups necessary for contamination monitoring can be reduced and with it the costs associated with the device 10.

It is also possible not only to compare the signals detected by the receiver elements 41a-44h, but also to convert the signals detected by the receiver elements 41a-44h into an angle and to compare the angles thus computed with each other. FIG. 5 shows the angular error for a contaminated receiver element 41b like that of FIG. 4a.

As an alternative, in monitoring the device 10 for contamination or damage to the receiver elements 41a-44h, it is also possible to determine the contrast value of a single receiver element 41a-44h and to compare it to a stored desired contrast value for the receiver element 41a-44h. Here the contrast is understood to be the ratio of the maximum signal amplitudes between the s-polarized light and the p-polarized light. To improve the monitoring process, it is also possible to measure the contrast of one or a plurality of groups 41, 42, 43, 44 of receiver elements and to compare said contrast with the desired contrast for one or a plurality of groups 41, 42, 43, 44 of receiver elements. Instead of comparing the contrast of the single receiver element 41a-44h, or the contrast of one or a plurality of groups 41, 42, 43, 44 of receiver elements 41a-44h, with desired contrast values, there can also be a comparison of the measured contrasts among themselves, in order to infer the presence of contamination or damage. Furthermore, the evaluation can distinguish between the contrast of individual receiver elements 41a-44h and the contrast of one or a plurality of groups 41, 42, 43, 44 of receiver elements, in order to thereby distinguish cases of contamination or damage to individual receiver elements 41a-44h from large-area contamination or damage to one or a plurality of groups 41, 42, 43, 44, or to the entire receiver 40. Both the desired contrasts and the contrasts determined during monitoring can be stored in a storage unit, not only to thereby permit a comparison with the desired value, but also to track the contrast evolutions over time during operation of the device 10.

In order to identify not only the contamination of the receiver elements 41a-44h of the receiver 40, but also the contamination of the element 30 influencing the direction of polarization, one embodiment specifies that the reception signals of the receiver elements having the same polarization planes can be evaluated independent of each other for two or more different relative positions occupied by the two objects 11, 12, in order to thereby distinguish an instance of contamination or damage to the receiver elements of the receiver 40 which is identified in the given receiver element during relative rotation between the objects 11, 12 from an instance of contamination or damage to the element 30 influencing the direction of polarization which is detected on different receiver elements of the receiver 40 during the relative rotation between the objects 11, 12.

The inspection or monitoring for cases of contamination or damage is preferably performed in a monitoring mode, in which the receiver elements 41a-44h belonging to the receiver 40 can be evaluated independently of each other. Here the monitoring mode is preferably activated when the device 10 is turned on, and/or at regular intervals of time. In the measuring mode for one embodiment of the invention, receiver elements with identical polarization planes can be selectively amplified and evaluated collectively in order to be integrated over a larger surface area and to thereby become insensitive to contamination. In particular, this makes it possible to minimize the number of signal paths necessary for the evaluation. As an alternative, in the measuring mode the independent evaluation of the individual receiver elements can involve either the receiver elements with the same polarization planes only or all the receiver elements of the receiver 40.

The monitoring mode can be activated over an interface by a superordinate control unit or by a control unit integrated into the receiver 40.

In one embodiment, the device 10 has a storage unit, particularly a non-volatile storage unit, e.g., an EEPROM, in which tolerance values can be stored and/or desired contrasts and/or discrepancies, contrasts, and other measurements or computed values made during operation. Moreover, the device 10 can have an output unit (not depicted) which issues an error message, e.g., in the form of an optical or electrical signal, in order to draw attention to a malfunction caused by contamination or damage and in order to permit the device 10 to be monitored.

In one embodiment, the transmitter 20 can emit pulsed light or can be operated in a frequency-modulated fashion, in order to suppress background light and, at the same time, to permit functional monitoring of the different signal paths in the case of safety applications.

LIST OF REFERENCE NUMERALS

10 device
11 object (shaft)
12 object (machine part)
20 transmitter
25 lens
27 beam splitter
30 element influencing the direction of polarization
35 reflector
40 receiver
41 group
41a receiver element
41b receiver element
41c receiver element
41d receiver element
41e receiver element
41f receiver element
41g receiver element
41h receiver element
42 group
42a receiver element
42b receiver element
42c receiver element
42d receiver element
42e receiver element
42f receiver element
42g receiver element
42h receiver element
43 group
43a receiver element
43b receiver element
43c receiver element
43d receiver element
43e receiver element
43f receiver element
43g receiver element
43h receiver element
44 group
44a receiver element
44b receiver element
44c receiver element
44d receiver element
44e receiver element
44f receiver element
44g receiver element
44h receiver element
50 particle of dirt
D axis of rotation

The invention claimed is:

1. Process for measuring the angle of rotation of two objects (11, 12) rotating in relation to each other, with a transmitter (20) which is assigned to one of the objects (11), and with an element (30) which influences the direction of polarization, where the transmitter and the element (30) which influences the direction of polarization rotate relative to each other as a function of the rotation angle, and where the luminous intensity passing through, or reflected by, the element (30) influencing the direction of polarization and measured by a receiver (40) is evaluated as a signal dependent on the rotation angle, and where the receiver (40) has at least two groups (41, 42, 43, 44), each with at least two receiver elements (41a, 41b, 41c, 41d, 41e, 41f, 41g, 41h, 42a, 42b, 42c, 42d, 42e, 42f, 42g, 42h, 43a, 43b, 43c, 43d, 43e, 43f, 43g, 43h, 44a, 44b, 44c, 44d, 44e, 44f, 44g, 44h), such that each receiver element (41a-44h) is designed as a detector that is sensitive to polarization, and where the polarization planes of the receiver elements (41a-44h) in each group (41, 42, 43, 44) are rotated in relation to each other, wherein the reception signals of at least two of the receiver elements (41a, 41b, 41c, 41d, 41e, 41f, 41g, 41h; 42a, 42b, 42c, 42d, 42e, 42f, 42g, 42h; 43a,

43b, 43c, 43d, 43e, 43f, 43g, 43h; 44a, 44b, 44c, 44d, 44e, 44f, 44g, 44h) are evaluated independent of each other in a monitoring mode,
- wherein the different groups (41, 42, 43, 44) of receiver elements are positioned so as to be spatially separate from each other,
- wherein the different groups (41, 42, 43, 44) are identically designed, such that in each of the groups there is positioned one of the receiver elements with the same polarization plane as another one of the receiver elements belonging to a different group,
- wherein the reception signals of at least two of the receiver elements (41a-44h) having the same polarization planes can be compared with each other in the monitoring mode, and
- wherein in the monitoring mode, the reception signals of at least two of the receiver elements (41a-44h) are converted into an angle, and the computed angle is compared to the angle which was computed from the reception signals of at least two other receiver elements having the identical relative angular offset in their polarization planes.

2. Process according to claim 1, wherein in the monitoring mode, the reception signals of at least two of those receiver elements (41a-44h) which are positioned in one of the groups (41) are converted into an angle, and the computed angle is compared to the angle which was computed from the reception signals of at least two other receiver elements (42a-42h) which are positioned in one of the other groups (42) and which have the identical relative angular offset in their polarization planes.

3. Process according to claim 1, wherein for the case in which the comparison yields a discrepancy, the discrepancy is compared to a stored tolerance value.

4. Process according to claim 3, wherein a warning message is issued when the tolerance value is exceeded.

5. Process according to claim 1, wherein in the monitoring mode the contrast of one of the receiver elements (41a-44h) or the contrast of one or several groups (41, 42, 43, 44) of receiver elements, is determined, and this contrast is compared to a stored desired contrast of either a single receiver element (41a-44h) or one or several groups (41, 42, 43, 44) of receiver elements, or this contrast is compared to the contrast of a different individual receiver element (41a-44h) or to the contrast of a different group or plurality of groups (41, 42, 43, 44) of receiver elements.

6. Process according to claim 5, wherein the contrasts identified in the monitoring mode are stored in a storage unit.

7. Process according to claim 1, wherein the reception signals of at least two of the receiver elements (41a-44h) for at least two different relative positions occupied by the two objects (11, 12), are evaluated independent of each other in a monitoring mode.

8. Process according to claim 1, wherein the reception signals of the receiver elements (41a-44h) are amplified collectively and are evaluated in a measuring mode and, in particular, are averaged.

9. Process according claim 1, wherein individual receiver elements (41a-44h) or groups of receiver elements (41, 42, 43, 44) can be shut off.

10. Process according to claim 1, wherein the monitoring mode can be activated by a superordinate control unit via an interface, or by a control unit integrated into the receiver (40).

11. A device for measuring the rotation angle of two objects (11, 12) rotating in relation to each other comprising:
- a transmitter (20) that is assigned to one of the objects;
- an element (30) which influences the direction of polarization, such that the transmitter (20) and the element (30) influencing the direction of polarization rotate in relation to each other as a function of the rotation angle; and
- a receiver (40) which measures the luminous intensity passing through, or reflected by, the element (30) which influences the direction of polarization, in order to produce a signal dependent on the rotation angle, such that the receiver (40) has at least two groups (41, 42, 43, 44), each with at least two receiver elements (41a-44h), where each receiver element (41a-44h) is designed as a detector that is sensitive to polarization, and where the planes of polarization of the receiver elements (41a-44h) in each group (41, 42, 43, 44) are rotated in relation to each other,
- wherein the reception signals of at least two of the receiver elements (41a-44h) can be evaluated independent of each other in a monitoring mode,
- wherein the different groups (41, 42, 43, 44) of receiver elements are positioned so as to be spatially separate from each other,
- wherein the different groups (41, 42, 43, 44) are identically designed, such that in each of the groups there is positioned one of the receiver elements with the same polarization plane as another one of the receiver elements belonging a different group,
- wherein the reception signals of at least two of the receiver elements (41a-44h) having the same polarization planes can be compared with each other in the monitoring mode, and
- wherein in the monitoring mode, the reception signals of at least two of the receiver elements (41a-44h) are converted into an angle, and the computed angle is compared to the angle which was computed from the reception signals of at least two other receiver elements having the identical relative angular offset in their polarization planes.

12. The device according to claim 11, wherein the polarization planes of the receiver elements (41a-44h) in each group (41, 42, 43, 44) each are rotated 180°/n in relation to each other, where n is the number of receiver elements in the given group.

13. The device according to claim 11, wherein the transmitter (20) emits pulsed light or can be supplied with a modulation frequency.

14. The device according to claim 11, wherein the device has an output unit which emits an optical, acoustical, or other warning signal.

* * * * *